US008315573B2

(12) United States Patent
Bishop

(10) Patent No.: US 8,315,573 B2
(45) Date of Patent: Nov. 20, 2012

(54) EXTERNALLY SOURCED SYNCHRONIZED BEACON

(75) Inventor: Donald M. Bishop, Highlands Ranch, CO (US)

(73) Assignee: Sandwave IP, LLC, Loveland, CO (US)

( * ) Notice: Subject to any disclaimer, the term of this patent is extended or adjusted under 35 U.S.C. 154(b) by 385 days.

(21) Appl. No.: 11/417,686

(22) Filed: May 4, 2006

(65) Prior Publication Data
US 2006/0252378 A1    Nov. 9, 2006

Related U.S. Application Data

(60) Provisional application No. 60/677,626, filed on May 4, 2005, provisional application No. 60/677,625, filed on May 4, 2005.

(51) Int. Cl.
*H04B 1/00*    (2006.01)
(52) U.S. Cl. ........... 455/68; 370/328; 370/334; 370/350
(58) Field of Classification Search ........... 370/328, 370/334
See application file for complete search history.

(56) References Cited

U.S. PATENT DOCUMENTS

| | | | |
|---|---|---|---|
| 5,940,765 A * | 8/1999 | Haartsen | 455/462 |
| 6,028,853 A | 2/2000 | Haartsen | |
| 6,594,273 B1 | 7/2003 | McGibney | |
| 6,917,804 B2 | 7/2005 | Takayama et al. | |
| 6,961,555 B1 | 11/2005 | Philyaw | |
| 6,980,819 B2 | 12/2005 | Sugaya et al. | |
| 7,019,691 B1 | 3/2006 | Soltanian et al. | |
| 2003/0145092 A1 * | 7/2003 | Funato et al. | 709/229 |
| 2003/0186713 A1 | 10/2003 | Sugaya et al. | |
| 2003/0198212 A1 | 10/2003 | Hoctor et al. | |
| 2003/0202497 A1 * | 10/2003 | Csapo | 370/338 |
| 2004/0131034 A1 | 7/2004 | Sugaya | |
| 2004/0184477 A1 | 9/2004 | Tavli et al. | |
| 2005/0063348 A1 | 3/2005 | Donovan | |
| 2005/0064818 A1 | 3/2005 | Assarsson et al. | |
| 2005/0068934 A1 | 3/2005 | Sakoda | |
| 2005/0075118 A1 * | 4/2005 | Lewis et al. | 455/456.5 |
| 2005/0124294 A1 | 6/2005 | Wentlink | |
| 2005/0124344 A1 * | 6/2005 | Laroia et al. | 455/436 |
| 2005/0255844 A1 * | 11/2005 | Sugaya et al. | 455/426.1 |
| 2005/0255847 A1 | 11/2005 | Han et al. | |
| 2005/0286486 A1 * | 12/2005 | Miller | 370/351 |

* cited by examiner

*Primary Examiner* — Marcos Batista
(74) *Attorney, Agent, or Firm* — Russell S. Krajec; Krajec Patent Offices, LLC

(57) ABSTRACT

A system and method for communicating on a network having multiple radios by substantially simultaneously transmitting a beacon signal from the radios. A broadcast signal is received substantially simultaneously by all of the radios and used to coordinate subsequent beacon signals. The broadcast signal may be from another of the same radios, or may be a broadcast signal from a television broadcast, global positioning system broadcast, or any other broadcast designed to reach several radios substantially simultaneously. The radios may normally operate by detecting another transmission and refraining from transmitting until the transmission has ceased. However, while transmitting synchronized beacon signals, the radios may broadcast simultaneously.

25 Claims, 6 Drawing Sheets

EXTERNALLY SOURCED SYNCHRONIZED BEACON

CROSS REFERENCE TO RELATED APPLICATIONS

This application claims priority to and the benefit of U.S. provisional patent application Ser. No. 60/677,626 entitled "Externally Sourced Synchronized Beacon" filed May 4, 2005 by Donald M. Bishop, and U.S. provisional patent application Ser. No. 60/677,625 entitled "Self Synchronizing Beacon" filed May 4, 2005 by Donald M. Bishop, both of which are hereby expressly incorporated by reference. This application is related to and simultaneously filed with application Ser. No. 11/417,732 entitled "Self Synchronizing Beacon" by Donald M. Bishop and being commonly assigned, the entire contents of which are hereby expressly incorporated by reference.

BACKGROUND OF THE INVENTION a. Field of the Invention

The present invention pertains generally to communication networks and specifically to networks having multiple radios.

b. Description of the Background

Wireless communications networks are being widely deployed. In order to ensure subscriber coverage, a wireless network may have several radio transceivers positioned so that the coverage areas of the radios overlap. As radio coverage areas overlap, some interference and undesirable cross-communication between radios may occur. Such interference may decrease available bandwidth, which diminishes the number and quality of potential subscriber connections.

Many wireless protocols have a feature whereby a device can sense if another device is using the specific frequency or band, and the first device will refrain from transmitting. In some protocols, the first device may retry the transmission at a later time, which may be a randomly generated time. Such a feature aims to minimize one device 'talking over' another device and preventing both device's transmissions from getting through. This collision detection feature is widely used in many different protocols, including standard wired Ethernet and wireless Ethernet-based protocols such as IEEE 802.11 wireless protocols.

A distinct problem with such protocols is that the bandwidth is inherently underutilized and throughput for each device can be much less than optimal, especially when many devices are communicating on the network. When many devices attempt to communicate on the band simultaneously, the collision detection and avoidance procedures begin to occupy much of the communication bandwidth.

It would therefore be advantageous to provide a system and method for providing improved use of the available bandwidth for communication networks having several radios.

SUMMARY OF THE INVENTION

The present invention provides a system and method for communicating on a network having multiple radios by substantially simultaneously transmitting a beacon signal from the radios. A broadcast signal is received substantially simultaneously by all of the radios and used to coordinate subsequent beacon signals. The broadcast signal may be from another of the same radios, or may be a broadcast signal from a television broadcast, global positioning system broadcast, or any other broadcast designed to reach several radios substantially simultaneously. The radios may normally operate by detecting another transmission and refraining from transmitting until the transmission has ceased. However, while transmitting synchronized beacon signals, the radios may broadcast simultaneously.

An embodiment may include a network comprising: a plurality of radio terminals, each of the plurality of radios being adapted to establish at least one two-way data communication session, adapted to delay sending a transmission when another ongoing transmission is detected, and adapted to broadcast a beacon signal; wherein each of the plurality of radios being adapted to transmit the beacon signal substantially simultaneously by the method of receiving a broadcast signal having a timing component, and transmitting a plurality of beacon signals substantially simultaneously based on at least a portion of the broadcast signal.

Another embodiment may include a radio comprising: a transmitter; and a receiver; wherein the radio is adapted to establish at least one two-way data communication session, adapted to delay sending a transmission when another ongoing transmission is detected, adapted to broadcast a beacon signal, adapted to transmit the beacon signal substantially simultaneously by the method of receiving a broadcast signal having a timing component, and transmitting a beacon signal using a beacon rhythm derived from at least a portion of the broadcast signal.

Yet another embodiment may include a method comprising: identifying a broadcast signal having a timing component; determining a synchronized rhythm for transmission of a beacon signal based on the broadcast signal; establishing at least one two-way data communication session; delay sending a transmission when another ongoing transmission is detected; and transmitting the beacon signal in accordance with the synchronized rhythm.

Still another embodiment may include a radio communications protocol comprising: performing two-way communications with a second radio; detecting an ongoing transmission from a third radio and delaying transmitting a signal during the ongoing transmission; broadcasting a beacon signal on a repeated basis; receiving a synchronization signal comprising a timing component; synchronizing the beacon signal based on the timing component; and transmitting the beacon signal regardless of any ongoing transmissions from another radio.

DETAILED DESCRIPTION OF THE INVENTION

Figure 1:
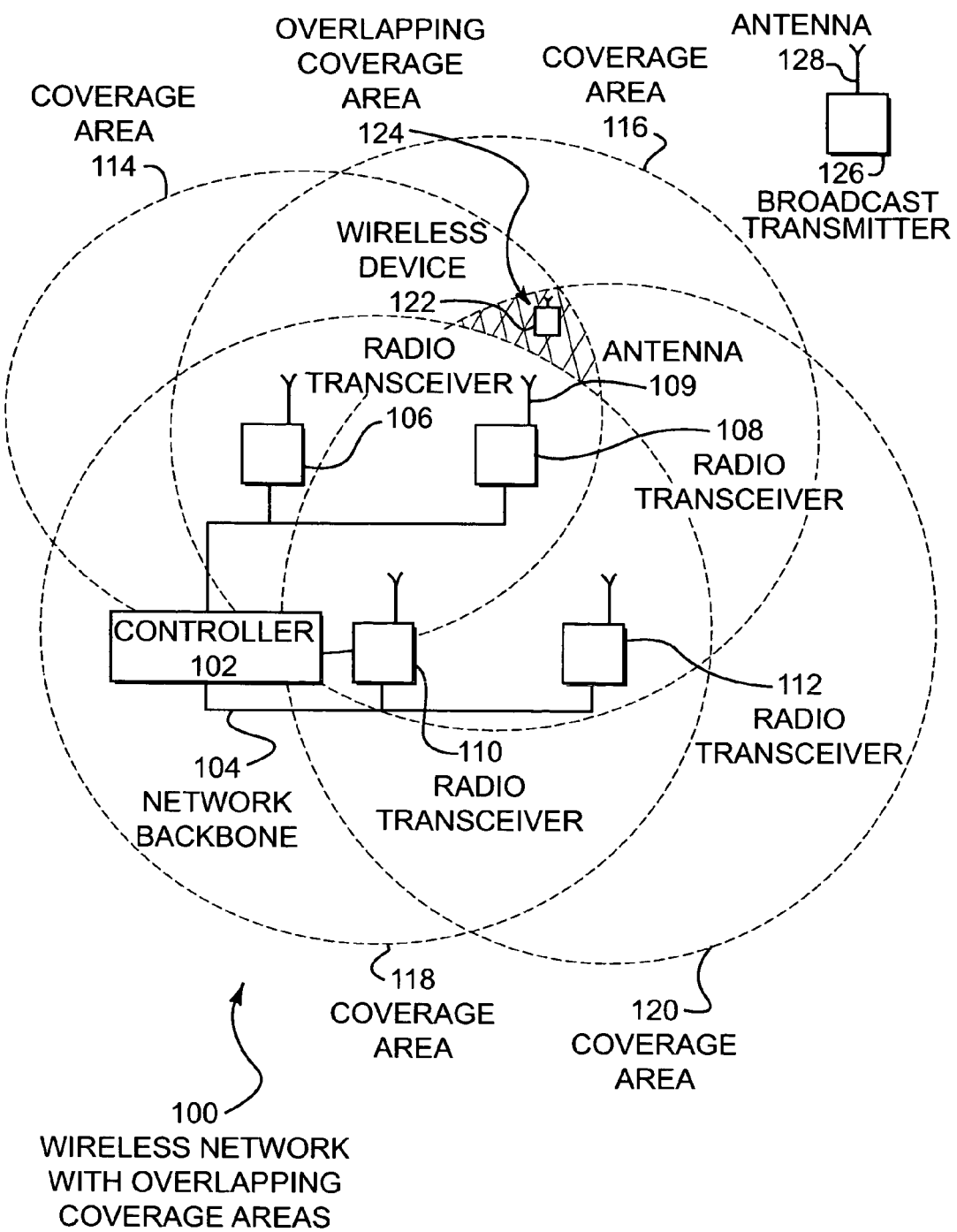
FIG. 1 is a diagrammatic illustration of an embodiment showing a wireless network with overlapping coverage areas.

Specific embodiments of the invention are described in detail below. The embodiments were selected to illustrate various features of the invention, but should not be considered to limit the invention to the embodiments described, as the invention is susceptible to various modifications and alternative forms. The invention is to cover all modifications, equivalents, and alternatives falling within the spirit and scope of the invention as defined by the claims. In general, the embodiments were selected to highlight specific inventive aspects or features of the invention.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The invention may be embodied as devices, systems, methods, and/or computer program products. Accordingly, some or all of the invention may be embodied in hardware and/or in software (including firmware, resident software, micro-code, state machines, gate arrays, etc.) Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the invention is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Throughout this specification, the term "comprising" shall be synonymous with "including," "containing," or "characterized by," is inclusive or open-ended and does not exclude additional, unrecited elements or method steps. "Comprising" is a term of art which means that the named elements are essential, but other elements may be added and still form a construct within the scope of the statement. "Comprising" leaves open for the inclusion of unspecified ingredients even in major amounts.

FIG. 1 illustrates an embodiment 100 showing a wireless network with overlapping coverage areas. A network controller 102 is connected to a network backbone 104. Connected to the backbone 104 are radio transceivers 106, 108, 110, and 112. Each radio transceiver has an antenna, such as antenna 109 connected to transceiver 108. Transceiver 106 has a coverage area 114. Similarly, transceivers 108, 110, and 112 have coverage areas 116, 118, and 120, respectively. A wireless device 122 is located in an overlapping coverage area 124. In the area 124, radio transmissions from transceivers 106, 108, and 112 all overlap. A broadcast transmitter 126 and antenna 128 may be located anywhere that a signal broadcast from antenna 128 may reach two or more of the radio transceivers.

In embodiment 100, two or more of the transceivers 106, 108, 110, and 112 may simultaneously transmit a beacon signal. By simultaneously transmitting a beacon signal, bandwidth is freed up that would otherwise be dedicated to transmitting and receiving beacon signals from transceivers with overlapping coverage areas.

Radio transceivers 106, 108, 110, and 112 may periodically transmit a beacon signal. Such a signal may identify the transceiver and provide information such that other devices in the area may begin communications. In many embodiments, the beacon signal may provide a unique identifier for the radio, as well as an identifier for the network and transmission parameters so that another device may successfully initiate communications.

In many cases, radios that communicate with digitized or other forms of data communication, in a similar way as human operated audio radio communication, are able to listen on the communication band, determine that the band is quiet, then begin a transmission. If another device is transmitting, the radio is able to wait until the band is quiet before attempting another transmission. This technique prevents two radios from simultaneously transmitting and distorting each other's signals.

Many standards have been developed for automated data transmission over wireless airwaves. Examples are cellular phone networks, wireless data standards such as IEEE 802.11, various spread spectrum and time division multiple access standards, and many others.

As more devices are attempting to communicate in a certain geographical area, the available bandwidth decreases. Especially after a certain number of devices is reached, the available bandwidth and data throughput decreases exponentially as more devices are added.

One reason for the decrease in bandwidth is the communications overhead associated with each device. For example, fixed base stations may transmit a beacon signal on a periodic basis. In a typical prior art application, when one radio transmits a beacon signal, another radio within the area would be thereby forced to wait to transmit its beacon signal or any other signal. In an area where many radio coverage areas overlap, a significant portion of the bandwidth might become cluttered with the repeated transmission of beacon signals of the transceivers from overlapping coverage areas. This is because as each radio transmits its own beacon signal, all other devices typically refrain from transmitting.

In the embodiment 100, two or more of the transceivers may simultaneously transmit beacon signals. The coordinated transmission of beacon signals may eliminate much of the transmission overhead on a channel or frequency that is shared by all the transceivers. The coordination and synchronization of the beacon signals may be accomplished using many methods. In one method, a broadcast transmitter 126 may broadcast a signal that may be interpreted as having a timing component used to synchronize several of the radios at one time.

In some embodiments, every transceiver having overlapping coverage area with another transceiver may transmit synchronized beacon signals, whereas in other embodiments two or more transceivers may do so. In particularly busy areas, synchronized beacon signals are especially useful, since the bandwidth can be at a premium in congested areas.

Some radio transmission schemes have a base and remote architecture. In such a scheme, the base stations have a defined transmission scheme that may include a repeated beacon signal. The remote devices in such a scheme may or may not transmit a beacon signal and may or may not be able to communicate directly from one remote device to another. Examples of such schemes include IEEE 802.11 and the various cellular phone architectures. In many cases, the base stations are connection points for other networks such as the Internet, cable television, or POTS phone system.

In contrast, other schemes have a peer to peer architecture. In such a scheme, each device operates in the same manner as all the other devices in the area and any device is able to transmit to any other device in the area.

One purpose of a beacon signal is to alert other devices in the area of a station's presence. In situations where a remote device is in the area of a base station, the remote device may be capable of listening for a base station's beacon signal, interpreting the signal, and establishing connections.

For example, the device 122 is located within the transmission coverage areas of radio transceivers 106, 108, and 112. The area 124 is highlighted showing the overlapping coverage areas. If the beacon signals of the transceivers 106, 108, and 112 were asynchronously transmitting beacon signals, each transceiver 106, 108, and 112 would wait until the other transceivers had completed their beacon signals before transmitting a beacon signal of its own. This process would take up at least three times the bandwidth of a single beacon signal. In some instances, since some devices may delay more than others after detecting that another device was transmitting, the bandwidth used up by the beacon signals may be four or more times the bandwidth consumed by a single beacon signal.

When the transceivers 106, 108, and 112 simultaneously transmit a beacon signal, the device 122 may be able to detect and decode at least one of the beacon signals. In practice, it is likely that the device 122 may detect and decode the beacon signal from the nearest transceiver. In this example, the device 122 may be able to detect and decode the beacon signal from transceiver 108 because the signal to noise ratio for the beacon signal from transceiver 108 may be greater than either of the simultaneous beacon signals from transceivers 106 and 112. In some situations, the device 122 may detect the beacon signals from one of the transceivers 106 or 112, depending on the relative signal strength of the particular beacon signal.

Overlapping coverage areas are typical of many wireless networks where a full coverage is desired over a specific area. For example, a wireless data network may provide coverage in a large building, shopping mall, or airport using multiple radio transceivers with overlapping coverage areas. Similarly, a school campus or residential neighborhood may be blanketed by various wireless networks for data, voice, or other communications.

For the purposes of this specification, the terms "radio," "radio transceiver," "wireless access point," "transceiver," and similar terms are used interchangeably. Similarly, the terms "backbone," "network," "network backbone," etc. are also used interchangeably.

In some embodiments, the radio transceivers may have a mode by which all transmissions, including beacon signals are delayed when the radio detects that another transmission is occurring. The radio transceivers may have a second mode which forces the beacon signals to be transmitted at the synchronized time, regardless if another device is transmitting.

Many network architectures comprise a network backbone with several wireless transceivers attached to the backbone. For example, a wireless service provider may connect several wireless access points using digital subscriber line (DSL) connections to a central access point. In another example, a cable television and internet connection service may be provided through a hybrid fiber/coax (HFC) network with wireless subscriber connections mounted on utility poles or utility pedestals in a neighborhood.

The network backbone 104 may be any type of hardwired or wireless connection between the various transceivers. In some configurations, the backbone 104 may be fiber optic cable, coaxial cable, twisted pair, or some other directly connected communication path. In other configurations, microwave communications or other radio frequency may be used to connect various portions of the network. In still other configurations, any combination of connection may be used.

The controller 102 may be any type of device in communication with one or more of the transceivers. In some configurations, the controller 102 may be a centralized computer, hub, switch, gateway, headend, Cable Modem Termination System (CMTS), Digital Subscriber Line Access Multiplexer (DSLAM), or any other device that communicates along the backbone 104. In some configurations, the controller 102 may provide connection between the backbone 104 and the Internet, telephone network, or another outside network.

In some configurations, the controller 102 may be a dedicated device that provides a synchronization function for the transceivers. In still other configurations, one of the transceivers may have a controller function enabled and function as both a transceiver as well as the controller 102.

The controller 102 may provide various sorts of communications in order to set up and control the radio functions of the various transceivers. For example, the controller 102 may send commands to the radio transceivers to initiate sequences for synchronizing or for setting the mode from normal to synchronous beacon transmittal. In many cases, the controller 102 may additionally monitor the performance of the radio transmitters.

Figure 2:
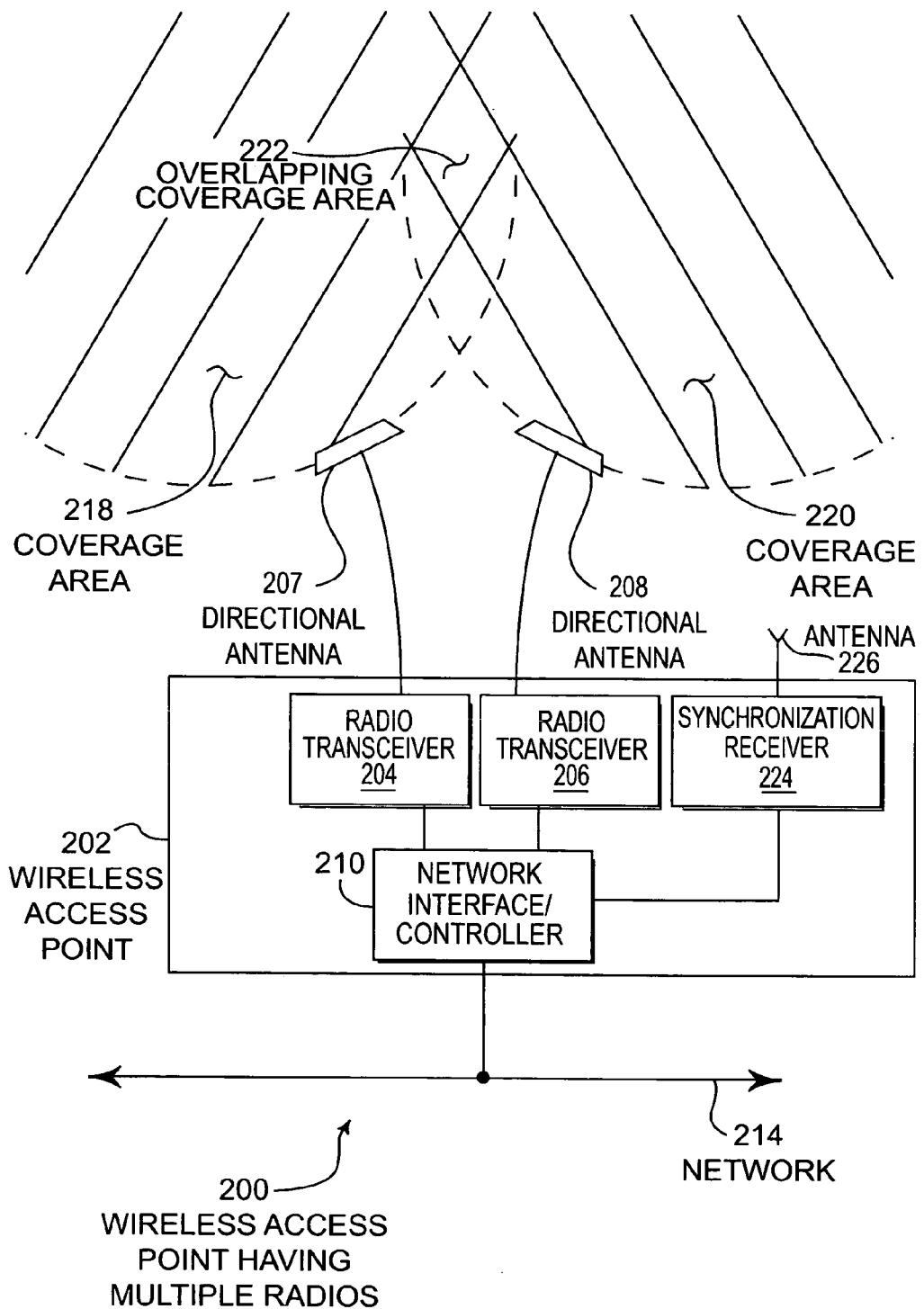
FIG. 2 is a diagrammatic illustration of an embodiment showing a wireless access point having multiple radios.

FIG. 2 illustrates an embodiment 200 of a wireless access point having two radio transceivers. The wireless access point 202 contains radio transceivers 204 and 206. Directional antennas 207 and 208 are connected to transceivers 204 and 206, respectively. A synchronization receiver 224 has antenna 226. A network interface 210 connects the transceivers to the network 214. The directional antenna 207 has a coverage area 218. Similarly, the directional antenna 208 has a coverage area 220. The overlapping coverage area 222 is the area where both antenna signals overlap.

The wireless access point 202 may be a single device that is fixedly mounted in an area for wireless communications. For example, the wireless access point 202 may be mounted in an airport terminal, a coffee shop, a residential neighborhood, an office building, or any other area where it is desired to service the area with two or more radio transceivers. In many cases, a single radio transceiver may be overwhelmed by the communications, so it may be desirable to service the area by using multiple radios with directional antennas to cover specific sectors. In some cases, the sectors may overlap, while in other cases the sectors may not overlap.

In some configurations, the proximity of the antennas 207 and 208 may cause some interference between the two radio systems. In such cases, it is possible that the beacon signal from one antenna may be received by the other antenna, causing the receiving transceiver to become quiet while the other transceiver is transmitting in some modes of operation.

The beacon signals of the two radio transceivers 204 and 206 may be synchronized by the controller 210 using an incoming signal received by the synchronization receiver 224. The synchronization receiver 224 may be any type of receiver that may receive a broadcast signal. For example, the receiver 224 may be capable of receiving a standard shortwave time signal, a television broadcast, an AM or FM radio broadcast, satellite transmissions including global positioning system (GPS) signals, or any other type of broadcast on any frequency, standard, or protocol.

In some cases, the synchronization broadcast may be a specialized protocol on a specific frequency that is only intended for a synchronization operation. For example, when a network is installed, a portable transmitter may be set up in the area and used to broadcast synchronization signals that reach at least some of the wireless access points of the network.

In other cases, the synchronization broadcast may be a transmission that has another purpose but could also be used for synchronizing the wireless access points on a network. For example, a GPS transmission or broadcast television signal has one or more time elements in a transmission that may be used to synchronize the beacon signals of the wireless access points. In such a case, the synchronization receiver 224 may receive a signal such as a broadcast television signal and the controller 210 may decode the signal to extract a timing element that can be used to synchronize the beacon signals. Almost any broadcast signal with one or more known elements may be used for synchronizing the beacon signals.

In some cases, one of the radio transceivers 204 or 206 may be used as the synchronization receiver 224. For example, the radio transceiver 206 may be capable of receiving the specific frequency or protocol of the broadcast synchronization signal. The radio transceiver 206 may then receive the broadcast synchronization signal and relay the signal to the controller 210 for decoding or other processing.

Over the network, each wireless access point may receive the same signal and decode the signal in the same manner. As each wireless access point does so, it may establish an internal beacon rhythm and begin transmitting beacon signals on the beacon rhythm that may correspond with the beacon transmissions of other wireless access points.

In many configurations, the radio transceivers 204 and 206 may be independent devices having separate processors and capable of operating independently from each other. Such a configuration may allow each transceiver 204 or 206 to conduct separate communications with devices within its coverage area. Each transceiver 204 and 206 may have a dedicated input line or be otherwise adapted to receive a beacon rhythm signal from the controller 210 or beacon heartbeat generators 212 or 216.

The network interface/controller 210 may perform several functions, including transmitting communications between the network 214 and the radio transceivers 204 and 206. In some configurations, the network interface/controller 210 may have a processor or state machine that is independent from the radio transceivers 204 and 206.

The embodiment 200 illustrates an example of a multiple radio transceiver system where the radio transceivers are located in very close proximity. Some configurations may have three or more radio transceivers. In some configurations, the system may have the wireless access point 202 located in one location, with the directional antennas 207 and 208 located remotely. For example, a wireless access point 202 may be located on one floor of a multistory building while the various directional antennas may be each located on a different floor of the building. The directional antennas in such an example may have a horizontal coverage area that covers one floor of the building.

The embodiment 200 functions in a similar manner as the embodiment 100, with multiple radios having a synchronized beacon signal. In the case of embodiment 200, the 'backbone' may be a communication path through the controller 210.

In a specific configuration of embodiment 200, a wireless access point 202 may be mounted in a single box with the directional antennas 207 and 208 mounted on the outside surface of the box. Such a configuration may be mounted on an interior wall of a building, whereas a weather tight configuration may be mounted on a utility pole, utility pedestal, or on an exterior wall of a building.

The network 214 may be any type of communication network. For example, the network 214 may be a cable television network, a twisted pair digital subscriber line ('DSL') network, Ethernet, or other type of wired connection. In other examples, the network may be a wireless network designed to not interfere with the radio transmitters 204, 206, or 224. In still other examples, the network may be a fiber optic network or other optical communication medium. Any type of communication medium and any protocol may be used to communicate via the network 214.

Figure 3:
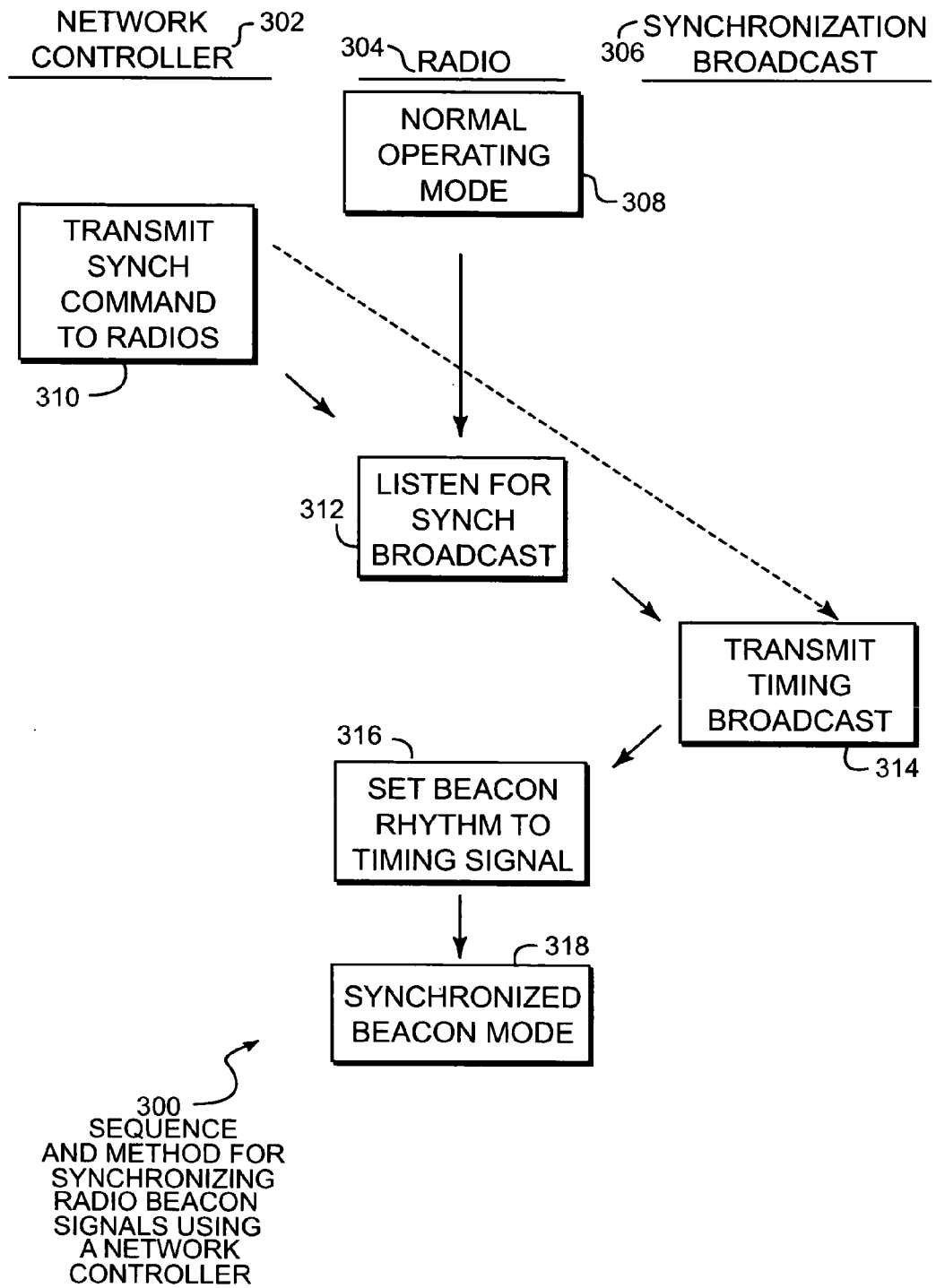
FIG. 3 is a flowchart illustration of an embodiment showing a method for synchronizing beacon signals for radios.

FIG. 3 illustrates an embodiment 300 of a method for synchronizing beacon signals for networked radios. The embodiment 300 snows the operations of three different devices: a network controller 302, a radio 304, and the synchronization broadcast radio 306. The radio begins in normal operating mode in block 308. The network controller transmits a synchronization command in block 310 to the radio 304 and optionally to the synchronization radio 306. The radio 304 begins listening for the synchronization broadcast in block 312. When the synchronization radio 306 transmits a timing broadcast in block 314, the radio 304 receives the broadcast and sets the beacon timing rhythm to the timing signal in block 316. The radio 304 begins synchronized beacon mode in block 318.

Embodiment 300 illustrates one method whereby a controller 302 may initiate the synchronization sequence. Before the sequence, the radio 304 may be operating in a normal operating mode, which may not force beacon signals to be sent at specific intervals. In some cases, however, the radio 304 may be operating in synchronized beacon mode at the start of the sequence. At the end of the sequence, the radio 304 may operate in synchronized mode wherein the beacon signal is transmitted on the beacon rhythm.

In some configurations, a radio system may not have a separate radio receiver that is used for receiving synchronization broadcasts. In such a configuration, the radio may have to enter a mode as in block 312 where the radio ceases transmitting for a short period of time so that it will be able to receive the timing broadcast.

The controller 302 may send the command of block 310 to both the radio 304 and synchronization broadcast radio 306. When the synchronization radio 306 is responsive to the command of the controller 302, the interval between blocks 312 and 316 may be quite short. If the synchronization broadcast radio 306 is not capable of being initiated by the controller 302, the time period between blocks 312 and 316 may be quite lengthy.

In an embodiment such as embodiment 200, where two transceivers are present in one wireless interface, one of the two radios may be commanded to go into the listen mode of block 312 while the other radio continues normal operation. In another example using embodiment 200, the synchronization receiver 224 may be commanded to enter into the listen mode of block 312.

Embodiment 300 allows a network controller 302 the ability to force synchronization to occur and to change the operating mode of the radio. In many cases, the radio 304 may first listen for any ongoing transmissions before it sends a message. In a normal operating mode, this attribute may be applied to beacon signals. While in such a mode, if several radios attempted to transmit a beacon signal, each radio may wait for the other radio to finish a beacon signal before transmitting its own. In order to gain the benefits of synchronizing beacons across several radios, each radio may ignore the other transmissions for the period of time during the beacon transmission. Such a mode is shown in block 318.

Figure 4:
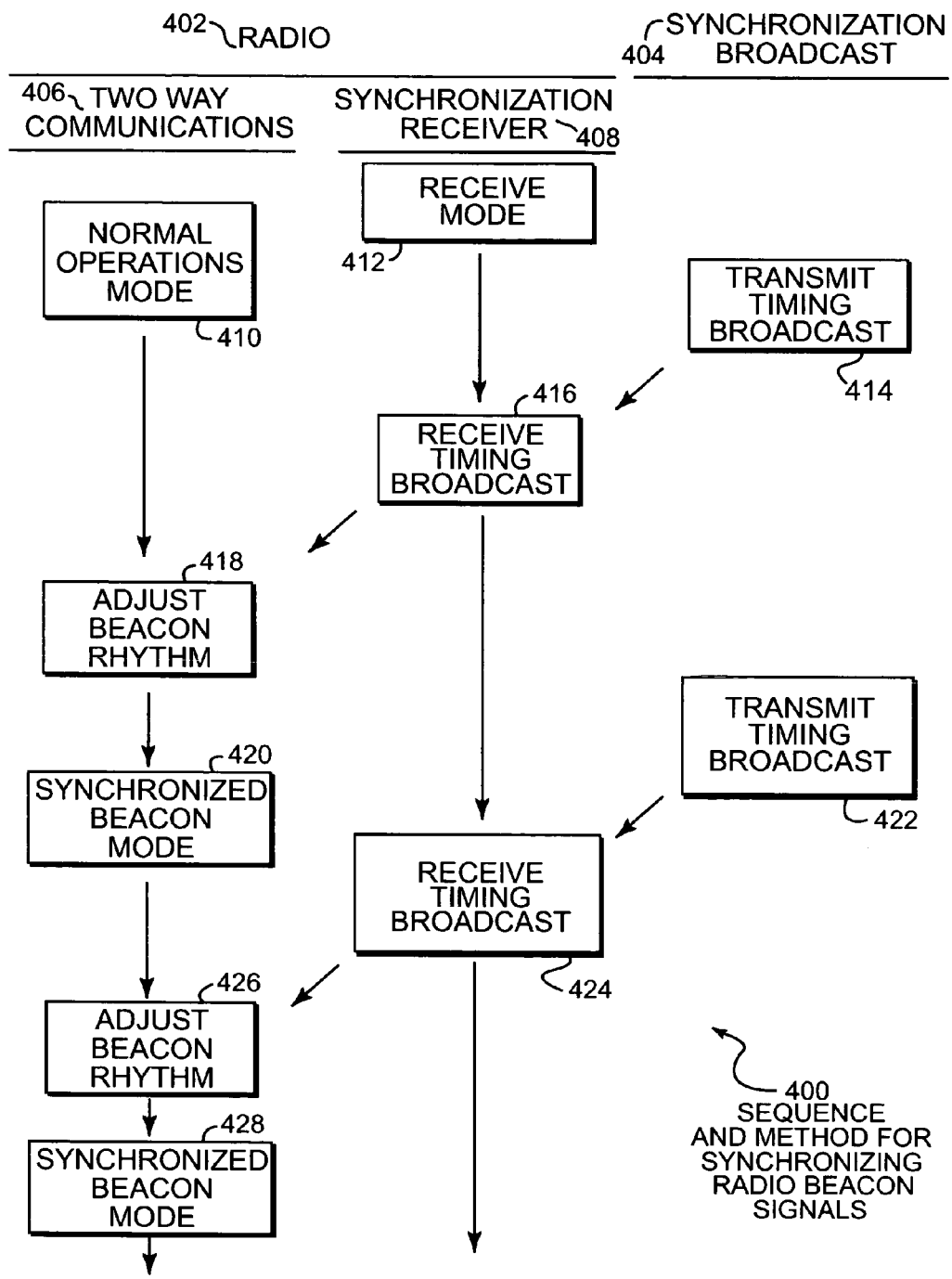
FIG. 4 is a flowchart illustration of an embodiment showing a method for synchronizing beacon signals for radios using a synchronization receiver.

FIG. 4 illustrates an embodiment 400 showing a sequence and method for synchronizing radio beacon signals when a synchronization receiver is present. The illustration shows the operations for a radio 402 and a synchronization broadcast 404. The radio 402 is comprised of a two way communication radio 406 and a synchronization receiver 408. The two way communication radio 406 may begin in normal operations mode in block 410. Similarly, the synchronization receiver 408 may begin in receive mode 412. When the synchronization broadcast transmission occurs, a timing broadcast is transmitted in block 414 which is received in block 416 by the synchronization receiver 408. The beacon rhythm is adjusted in block 418 to correspond to the timing of the synchronization broadcast.

The two way radio 406 enters synchronized beacon mode in block 420. When a second timing broadcast is transmitted in block 422 and received in block 424, the beacon rhythm may be adjusted again in block 426. After adjusting, the two way radio 402 resumes synchronized beacon mode in block 428.

Embodiment 400 illustrates an example of a repeated synchronization broadcast, which may be from a television broadcast, radio or satellite broadcast, including GPS broadcasts, or other type of repeated broadcast. The repeated broadcast may be on very specific and controlled intervals, or may be haphazard and infrequent, depending on the specific embodiment. In some cases, the frequency of the timing broadcast may be much more frequent than desired and many timing broadcasts may be ignored. In some embodiments, the synchronization broadcast 404 may be a dedicated broadcast for the purpose of transmitting timing broadcasts.

In other embodiments, the synchronization receiver may be one of several receivers in a wireless access point such as embodiment 200. In such an embodiment, the synchronization receiver 408 may be one of the radio transceivers 204 or 206 and the timing broadcast of blocks 414 and 422 may be a beacon signal sent from another radio.

Figure 5:
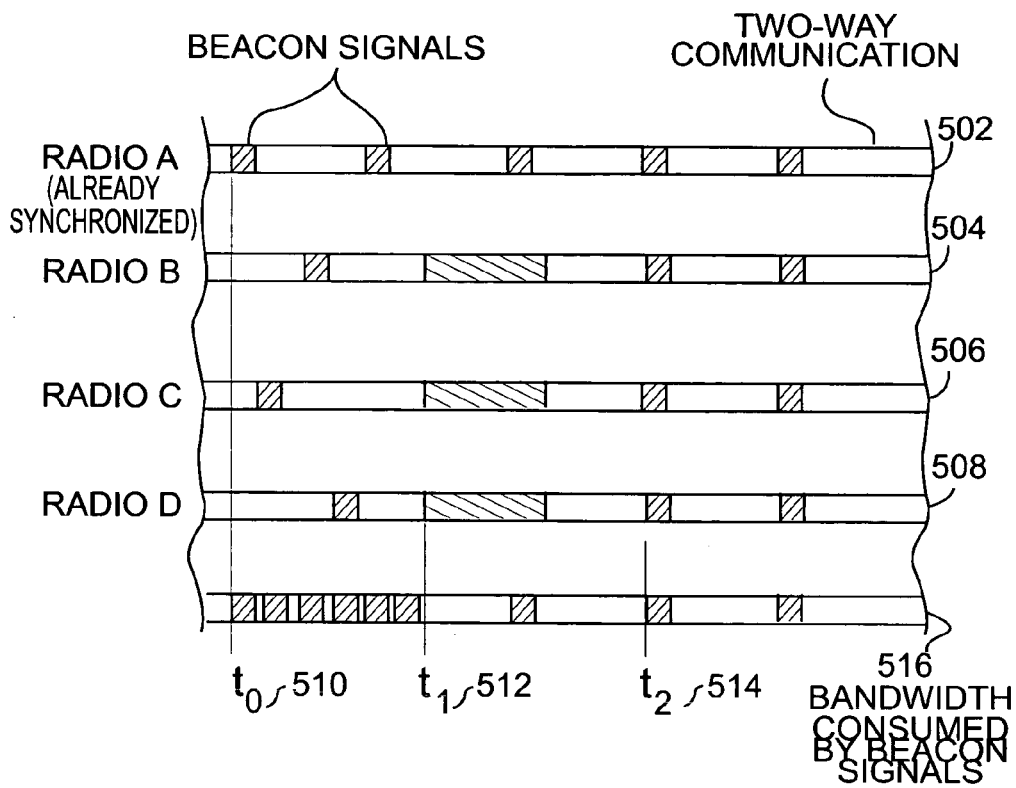
FIG. 5 is a timeline illustration of an embodiment showing a sequence for synchronizing beacon signals.
Figure 5:
Figure 5:

FIG. 5 illustrates a timing diagram embodiment 500 for a synchronization process. The timing diagram illustrates events as they occur from left to right. Four radios are depicted in lines 502, 504, 506, and 508. In the diagram, radio A, shown in line 502, has already been synchronized and does not undergo the synchronization process.

At time t0 510, all four radios are transmitting beacon signals at different times. In normal operation mode, where a radio waits to transmit while another radio is transmitting, much of the time between t0 510 and t1 512 is consumed by beacon signals. At time t1 512, a command is issued to radios in lines 504, 506, and 508 to listen for the synchronization transmission and adjust the beacon rhythm to that transmission. After time t3 514, all of the beacon signals occur substantially simultaneously.

The line 516 represents the total bandwidth consumed by beacon signals. The time between t0 510 and t1 512 graphically illustrate how multiple beacon signals that are not synchronized may use a considerable amount of bandwidth when the radios are placed close enough apart that they may receive transmissions from each other. The time after t2 514 graphically illustrate much less bandwidth that is consumed by beacon signals.

Figure 6:
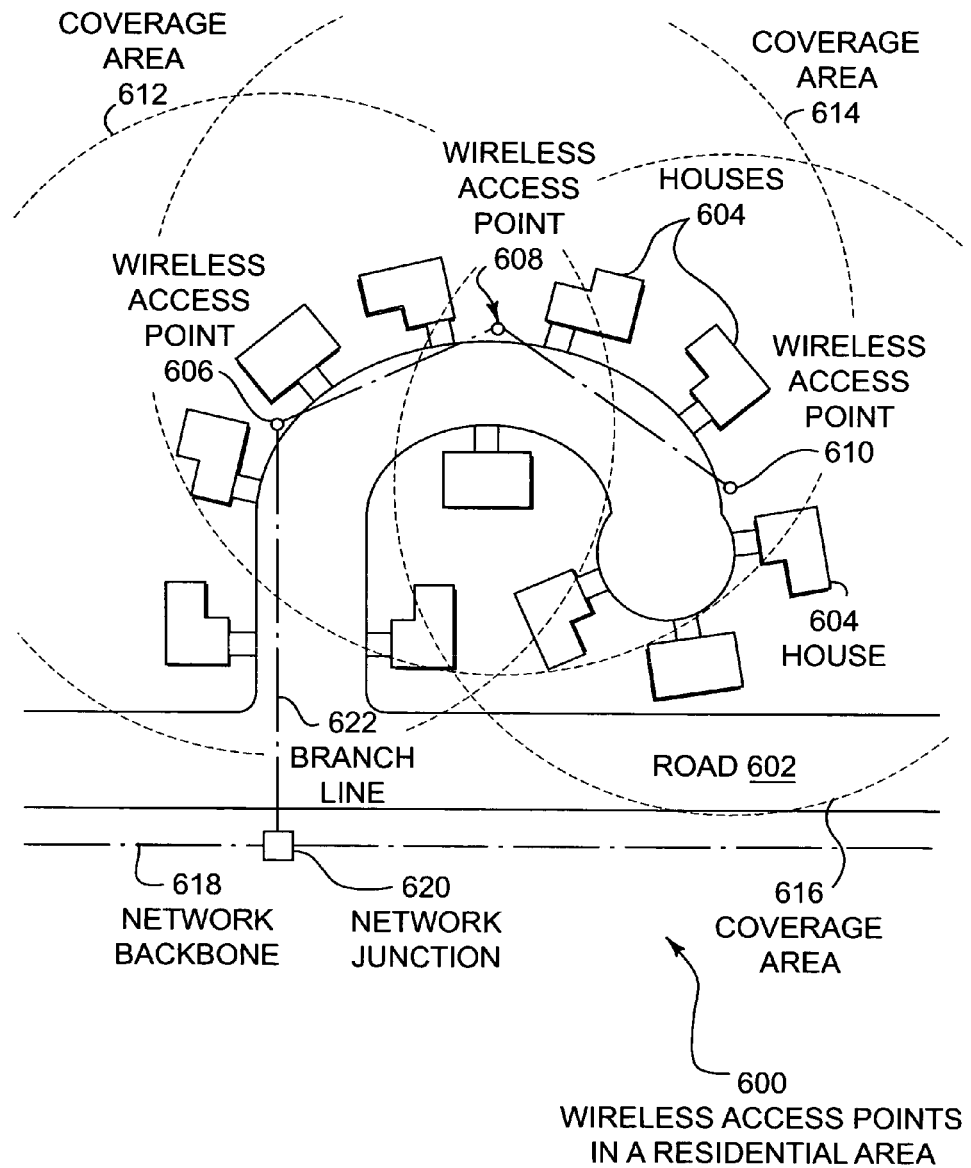
FIG. 6 is a plan view illustration of a residential neighborhood having wireless access service.

FIG. 6 illustrates a plan view of an embodiment 600 showing wireless access points deployed in a residential area. A road 602 is shown with several houses 604. Wireless access points 606, 608, and 610 are shown with their respective coverage areas 612, 614, and 616 that blanket the residential complex. The network backbone 618 runs along the main road 602 and has a junction 620 that connects the wireless access points 606, 608, and 610 along the branch line.

Embodiment 600 is an application for wireless connectivity in a residential area. The wireless access points 606, 608, and 610 may provide various communications to and from the homes 604, such as internet data connections, voice telephony, video services, and any other communication. In many applications, the wireless access points may use a standardized radio communications protocol, such as those defined by IEEE 802.11 specification. In other applications, different radio communications protocols, including custom or non-standard protocols, may be used.

The wireless access points 606, 608, and 610 may be mounted on utility poles for areas that have overhead utility lines. In areas with underground utilities, the wireless access points may be mounted on utility pedestals that are short stanchions connected to the underground cabling. The utility pedestals may also be used for making various connections with the underground cabling.

Each wireless access point 606, 608, and 610 may contain one or more radios. For example, directional antennas may be used to subdivide the coverage are 614 into several smaller sectors, with each sector being covered by at least one two way radio and an associated directional antenna.

The network backbone 618 may be a coaxial cable, fiber optic, twisted pair, or other communications cable. In some configurations, the network backbone 618 may be similar to a conventional cable television plant using DOCSIS or other communication protocols connected to a cable modem termination system ('CMTS'). In other configurations, the network backbone 618 may be twisted pair digital subscriber line ('DSL') lines that are connected using a digital subscriber line area manager ('DSLAM'). In still other configurations, the network may be an Ethernet or Ethernet-type network.

The wireless access points 606, 608, and 610 may be configured such that the beacon signals from all of the wireless access points are broadcast substantially simultaneously. The coordination and synchronization of the beacon signal may be performed by various methods, including the methods described in embodiments 300 and 400 and variations of such methods.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A network comprising:
   a plurality of radio terminals, each of said plurality of radios being configured to establish at least one two-way data communication session, configured to delay sending a transmission when another ongoing transmission is detected, and configured to broadcast a beacon signal;
   wherein each of said plurality of radios being configured to transmit said beacon signal simultaneously by the method of receiving a broadcast signal having a timing component, said broadcast signal being received over the air, said broadcast signal not being a beacon signal from another of said plurality of radios, said broadcast signal being an external signal, and transmitting a plurality of beacon signals using a beacon rhythm derived from at least a portion of said broadcast signal at the same time and on the same channel based on at least a portion of said broadcast signal.

2. The network of claim 1 wherein said plurality of radios are connected through a secondary communication path.

3. The network of claim 2 wherein said secondary communication path comprises at least one from a group composed of: a coaxial connection, a fiber optic connection, a twisted pair connection, a second wireless communications path, and an Ethernet connection.

4. The network of claim 2 wherein said secondary communication path comprises at least one from a group composed of: a cable television distribution network and a digital subscriber line distribution network.

5. A radio comprising:
   a transmitter; and
   a receiver;
   wherein said radio is configured to establish at least one two-way data communication session, configured to delay sending a transmission when another ongoing transmission is detected, configured to broadcast a beacon signal, configured to transmit said beacon signal at the same time and on the same channel as at least one other transmitter by the method of receiving a broadcast signal having a timing component, said broadcast signal not being a beacon signal from another of said plurality of radios, said broadcast signal being an external signal, said broadcast signal being received over the air, and transmitting a beacon signal using a beacon rhythm derived from at least a portion of said broadcast signal.

6. The radio of claim 5 wherein said at least one two-way communication session occurs within a first frequency band and said broadcast signal occurs within a second frequency band, said first frequency band and said second frequency band having at least some overlap.

7. The radio of claim 5 wherein said at least one two-way communication session occurs within a first frequency band and said broadcast signal occurs within a second frequency band, said first frequency band and said second frequency band having no overlap.

8. The radio of claim 5 wherein said broadcast signal is one from a group composed of: a television broadcast signal, a GPS broadcast signal, and a dedicated synchronized beacon.

9. The radio of claim 5 further configured to receive and not transmit during a beacon interval to receive beacon signals from one or more other radio transmitters.

10. The radio of claim 5 further configured to receive a synchronize command, wherein said synchronization command initiates a sequence comprising: disable transmission; receive at least one timing component of said broadcast signal; and enable two way communication.

11. The radio of claim 10 wherein said sequence further comprises using said timing component of said broadcast signal to determine the timing of said beacon signal.

12. The radio of claim 5 wherein having a secondary communication path.

13. The radio of claim 12 wherein said secondary communication path comprises at least one from a group composed of: a coaxial connection, a fiber optic connection, a twisted pair connection, a second wireless communications path, and an Ethernet connection.

14. The radio of claim 12 wherein said secondary communication path comprises at least one from a group composed of: a cable television distribution network and a digital subscriber line distribution network.

15. The radio of claim 5 further configured to operate in compliance with at least a portion of IEEE 802.11.

16. A method comprising:
   identifying a broadcast signal having a timing component said broadcast signal being transmitted over the air, said broadcast signal not being a beacon signal from another of said plurality of radios, said broadcast signal being an external signal;
   determining a synchronized rhythm for transmission of a beacon signal based on said broadcast signal;
   establishing at least one two-way data communication session;
   delay sending a transmission when another ongoing transmission is detected; and
   transmitting said beacon signal in accordance with said synchronized rhythm, said beacon signal being transmitted at the same time and on the same channel as another beacon signal.

17. The method of claim 16 wherein said at least one two-way communication session occurs within a first frequency band and said broadcast signal occurs within a second frequency band, said first frequency band and said second frequency band having at least some overlap.

18. The method of claim 16 wherein said at least one two-way communication session occurs within a first frequency band and said broadcast signal occurs within a second frequency band, said first frequency band and said second frequency band having no overlap.

19. The method of claim 16 wherein said broadcast signal is one from a group composed of: a television broadcast signal, a GPS broadcast signal, and a dedicated synchronized beacon.

20. The method of claim 16 further comprising receiving a synchronize command, said synchronize command comprising:
   disabling transmission;
   receiving at least one timing component of said broadcast signal; and
   enabling two way communication.

21. The method of claim 1 further comprising:
   using said timing component of said broadcast signal to determine said synchronized rhythm.

22. The method of claim 16 further comprising communication through a secondary communication path.

23. The method of claim 22 wherein said secondary communication path comprises at least one from a group composed of: a coaxial connection, a fiber optic connection, a twisted pair connection, a second wireless communications path, and an Ethernet connection.

24. The method of claim 22 wherein said secondary communication path comprises at least one from a group composed of: a cable television distribution network and a digital subscriber line distribution network.

25. The method of claim 16 further configured to operate in compliance with at least a portion of IEEE 802.11.

* * * * *